UNITED STATES PATENT OFFICE.

CARLETON ELLIS, OF MONTCLAIR, NEW JERSEY, ASSIGNOR, BY MESNE ASSIGNMENTS, TO SETH B. HUNT, TRUSTEE, OF NEW YORK, N. Y.

SEPARATION PROCESS OF MAKING ALCOHOLS.

1,365,046.     Specification of Letters Patent.     Patented Jan. 11, 1921.

No Drawing.     Application filed June 5, 1918. Serial No. 238,273.

*To all whom it may concern:*

Be it known that I, CARLETON ELLIS, a citizen of the United States, and a resident of Montclair, county of Essex, and State of New Jersey, have invented certain new and useful Improvements in Separation Processes of Making Alcohols, of which the following is a specification.

This invention relates to process of making alcohols from unsaturated hydrocarbons. The unsaturated hydrocarbons utilized are preferably unsaturated hydrocarbons of material such as cracked gasolene, shale oil and the like, and the same may be in the form of liquid of oil gas or vapor, or unsaturated hydrocarbons such as olefins or mixtures thereof, in substantially the pure state may be utilized in connection with the present invention.

The unsaturated hydrocarbons are preferably treated with an extracting agent, such as polybasic (dibasic, tribasic, etc.) acid, preferably a mineral acid, such as sulfuric acid, is used, though other suitable extracting agents may be resorted to.

When sulfuric acid is used, the treatment is preferably carried out under sulfating conditions, including the use of somewhat diluted acid with cooling, the temperature being preferably adjusted to the strength of acid, low temperatures being preferably utilized with stronger acid and higher temperatures with more dilute acid. Thorough agitation is preferably employed, and the acid is preferably entered into the olefin material gradually and preferably is in a finely sub-divided state, as in the form of spray.

The acid extract obtained is immiscible with residual hydrocarbons and may be separated therefrom, when present, by simple mechanical separation, as by settling and drawing off the separate layers formed. When the olefin material is in the vaporous or gaseous state, it may be contacted with the extracting agent, as sulfuric acid, in various ways, as by counter-current passage through towers containing finely divided refractory material, such as gravel, coke or the like, or by any other equivalent modes and the gases and vapors are brought into intimate contact with the extracting agent, as sulfuric acid, preferably in a finely divided state, and unsaturated hydrocarbons are extracted thereby in the form of a suitable acid extract.

The acid extract formed in the foregoing or other ways may be hydrolyzed and alcoholic materials produced therefrom. In an application of which I am a party, filed April 25, 1918, Serial No. 230,679, a process is described and claimed in which the extract is treated with a hydrolyzing agent, as water, to the amount of about two to three times the quantity of acid extract used, and this material is distilled, the alcohols coming over with water and some unsaturated hydrocarbons, as olefins and the like, while dilute sulfuric acid remains in the still along with other materials which do not distil over with steam at atmospheric temperatures. With the use of water for hydrolyzing, to the amount of about two to three times the amount of acid extract treated, the remaining acid is diluted and its reconcentration and recovery, though feasible, is expensive and troublesome.

According to the present invention, hydrolysis is carried out with a minimum amount of water or other hydrolyzing agent, and the acid need not be so greatly diluted so that its reconcentration and recovery is facilitated, and the acid recovered, even without reconcentration, may be sufficiently strong for further use for a variety of purposes where only moderately strong acid is needed.

Another object of the invention is the simplification of the operation of hydrolysis, whereby the alcohols may be obtained by means of simple mechanical separation which may be carried on rapidly with simple apparatus readily workable with large quantities of material, and this is preferably accomplished by the use of material having what may be termed a solvent affinity for the alcoholic material, which facilitates the carrying out of a simple mechanical separating action, whereby the alcoholic material separates as a layer from the moderately strong sulfuric acid, and may be readily drawn off and the materials divided into separate portions.

According to the present invention, the acid extract obtained in the foregoing or other ways is preferably diluted with hydrolyzing material, such as water, but when water is used as the hydrolyzing agent, only a relatively small quantity thereof is used, preferably sufficient to carry out the step of hydrolysis and to reduce the sulfuric acid strength sufficiently so that the alcoholic material produced is substantially insoluble therein. Such alcoholic material is substantially soluble in sulfuric acid of about 1.57 specific gravity, and sufficient water is preferably used to bring the strength of acid sufficiently below 1.57 specific gravity so that the alcoholic material is substantially insoluble in the acid, but dilution to an undue or unnecessary extent is preferably avoided. Where reconcentration of the acid is not an object, additional quantities of water may, of course, be used. Cooling is preferably resorted to while the water is being mixed with the acid extract, or vice versa, or, if desired, the hydrolyzing agent may be thoroughly cooled, as, for example, water may be introduced in the form of lumps of ice or the acid extract poured into ice.

On permitting this material to stand, (the ice, if used, having melted) layer separation may take place to some extent, the alcohols produced being substantially insoluble in the sulfuric acid, but such separation is slow and difficult to carry out, and even upon centrifuging for extended periods the layer separation may not take place or be completed.

I have discovered that by the use of a material having a solvent affinity for the alcoholic materials, this separation can be greatly facilitated and carried out in a practical and efficient manner even at low temperatures. One such material having such a solvent affinity for the alcoholic materials is benzol, but chloroform, ether, carbon bisulfid, toluol and other materials having similar qualities, may be resorted to. With the use of benzol as a separation aiding material, benzol to preferably the extent of about 10% of the unsaturated hydrocarbon material comprised in the acid extract may be used to advantage, though considerable variation in this respect is admissible, relatively very small quantities being effective in some cases, depending on the particular mixture of olefins extracted, and the benzol is preferably added after the addition of water and hydrolysis, though it may be added along with the water, and all the materials are thoroughly preferably strongly agitated together and then centrifuged or permitted to settle, whereupon complete separation is readily and quickly effected, the material separating into a lower layer of sulfuric acid of a gravity somewhat under 1.57, in which alcohols are substantially insoluble, and an upper layer comprising the crude alcohols with the solvent separation material, as benzol, and in some cases there may be still another top layer which may consist of hydrocarbons, as unsaturated hydrocarbons, such as olefins and the like, and there may also be, as, for example, when the material treated is gasolene containing saturated hydrocarbons, more or less saturated hydrocarbon material in such upper layer. Benzol also may be present in this hydrocarbon material. Such upper layer, however, may be substantially reduced by proper treatment of the acid extract before hydrolyzing, as, for example, by thoroughly centrifuging the same, whereby entrained hydrocarbons, as saturated and unsaturated hydrocarbons, may be substantially removed, and also, if desired, the extract may be subjected to further treatment for removal of such materials, as, for example, it may be subjected to vacuum treatment or the like for this purpose.

The layers may now be readily separated, as by drawing off from the bottom, first the diluted sulfuric acid separately and thereafter the mixture of alcohols and benzol, and still a third separation may be made if an upper layer as described is present to any material extent.

The alcoholic material may now be readily rectified, as by distillation, the quality of the alcoholic material being apparently improved by exposure to comparatively high temperatures during distillation.

The benzol may be separated from the alcohols as by fractional distillation and may be used over and over again, or if the percentage is small it may be allowed to remain in the alcohols.

The following example is given to assist in affording an understanding of one way in which the invention may be carried out and not for limitation:

To 10 parts by volume of olefin material produced from cracked gasolene was gradually added 10 parts of sulfuric acid of about 1.8 specific gravity with efficient agitation and cooling, and to the acid extract so obtained 2 parts of water was added with agitation and cooling. Two equal quantities of this material were taken, and to one of these was added a quantity of benzol equal to about 10% of the olefin material present and both were strongly centrifuged. In the sample to which benzol was added a clear cut separation took place into a lower light colored layer of sulfuric acid consisting of slightly over 12 parts, a second layer of crude alcoholic material and benzol fairly dark in color and consisting of about 9 parts, and a thin top layer of hydrocarbons, while in the other sample centrifuged for the same time, only more or less faint indications of separation were discernible.

It will be seen that by the present invention the manufacture of alcoholic materials can be carried on rapidly and efficiently with simple apparatus, all the steps involved, from the original treatment of the olefin material to the production of the crude alcoholic material, being adapted to be performed rapidly and, if desired, continuously, and the separations which are effected being adapted to be performed by simple mechanical operations without the necessity of resorting to pressure, high temperatures or other troublesome factors of operation.

I claim:

1. The process of producing alcoholic material which comprises the steps of sulfating unsaturated hydrocarbons including olefins to form acid extract, hydrolyzing the acid extract, and effecting a separation of the alcoholic material produced from the acid material by means of an agent having a solvent affinity for the alcoholic material.

2. The process of producing alcoholic material from olefin material which comprises treating the olefin material with sulfuric acid under sulfating conditions, separating the acid extract obtained from residual hydrocarbons, hydrolyzing the acid extract with water whereby alcoholic materials and sulfuric acid are obtained, and separating the alcoholic material from the sulfuric acid by means of a material having a solvent affinity for the alcoholic material.

3. The process of producing alcoholic material from olefins which comprises reacting on the olefins with sulfuric acid whereby reactive acid liquor is obtained, reacting on the acid liquor with water in the cold whereby alcohols are produced and sulfuric acid regenerated, adding benzol and settling, whereby layer separation is effected between the alcohols and the acid, and withdrawing the layers of acid and the alcohols separately.

4. The process of producing alcoholic material from olefin material which comprises reacting thereon with sulfuric acid under sulfating conditions whereby an acid liquor is formed adapted to produce alcoholic material upon hydrolysis, treating the acid liquor with water only sufficient to effect hydrolysis to alcohols and to reduce the specific gravity of the sulfuric acid to below 1.57, and effecting a layer separation between the acid and alcohols by means of material having a solvent affinity for the alcohols.

5. The process of producing alcoholic material which comprises treating cracked gasolene with sulfuric acid under sulfating conditions, separating the acid extract obtained from residual hydrocarbon material, reacting on the acid with a hydrolyzing material whereby alcohols are produced and separating the alcohols from other materials present by addition of benzol having a solvent affinity for the alcohols.

6. The process of producing alcoholic material substantially corresponding to olefins of cracked gasolene which comprises treating cracked gasolene with a quantity of sulfuric acid substantially equal to the unsaturated hydrocarbon content thereof under sulfating conditions, separating the acid extract from residual hydrocarbon material, hydrolyzing with water only sufficient to reduce the acid strength to a point where alcoholic material produced is substantially insoluble therein, effecting a layer separation of acid from alcohols by means of benzol, recovering the acid by mechanical separation, and recovering the benzol from the alcoholic material by distillation.

7. The process of separating alcoholic material from sulfuric acid which comprises adding benzol to mixtures thereof and thereby effecting a layer separation.

8. The process of separating alcoholic material from sulfuric acid which comprises adding a material having solvent affinity for the alcoholic material to mixtures thereof with sulfuric acid.

9. The process of reacting on olefins with sulfuric acid to yield acid extract, reacting on the extract with hydrolyzing material whereby alcohols are formed, and adding benzol to the products of reaction, whereby alcohols are obtained as a layer together with the benzol used.

10. The process of separating alcohols from somewhat dilute sulfuric acid which comprises the step of incorporating benzol with a mixture thereof, whereby separation is effected.

11. The process of separating alcoholic material from sulfuric acid consisting in treating a mixture thereof with a material which dissolves the alcoholic material but not the sulfuric acid.

In testimony that I claim the foregoing, I hereto set my hand, this 1st day of June, 1918.

CARLETON ELLIS.